United States Patent [19]

König et al.

[11] 4,446,293

[45] May 1, 1984

[54] LOW-SOLVENT, THERMOSETTING REACTIVE POLYURETHANE COATING COMPOSITION, A PROCESS FOR ITS PRODUCTION AND ITS USE IN DIRECT AND REVERSE COATING PROCESSES

[75] Inventors: Eberhard König, Kronberg; Wilhelm Thoma, Leverkusen; Josef Pedain, Cologne; Klaus König, Leverkusen, all of Fed. Rep. of Germany

[73] Assignee: Bayer Aktiengesellschaft, Leverkusen, Fed. Rep. of Germany

[21] Appl. No.: 378,152

[22] Filed: May 14, 1982

[30] Foreign Application Priority Data

May 23, 1981 [DE] Fed. Rep. of Germany ....... 3120596

[51] Int. Cl.³ .............................................. C08G 18/10
[52] U.S. Cl. ......................................... 528/45; 528/64
[58] Field of Search ........................................... 528/45

[56] References Cited

U.S. PATENT DOCUMENTS

| | | | |
|---|---|---|---|
| 3,640,967 | 2/1972 | König et al. | 528/80 |
| 3,900,688 | 8/1975 | Thoma et al. | 428/246 |
| 4,248,756 | 2/1981 | König et al. | 528/45 |
| 4,299,868 | 11/1981 | Berndt et al. | 427/389.9 |
| 4,369,301 | 1/1983 | König et al. | 528/45 |

FOREIGN PATENT DOCUMENTS 1770245 10/1971 Fed. Rep. of Germany .

*Primary Examiner*—John Kight, III
*Assistant Examiner*—M. L. Moore
*Attorney, Agent, or Firm*—Gene Harsh; Joseph C. Gil; Thomas W. Roy

[57] ABSTRACT

The invention relates to low-solvent, thermosetting reactive polyurethane coating compositions which are particularly resistant to light, oxidation and hydrolysis, do not crystallize or harden and comprise the following components:

(A) a ketoxime-blocked NCO-prepolymer of
  1. 1 mole of 2- to 4-functional, relatively high molecular weight polyhydroxyl compounds comprising a polyester polycarbonate based on ester glycols of ε-caprolactone and 1,6-hexane diol;
  2. about 0.1 to 1.2 moles of low molecular weight polyols containing bis-carbazinic ester polyols corresponding to the following general formula

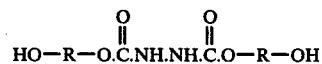

in which R is a straight-chain and/or branched $C_1$-$C_5$-alkylene or hydroxyl-substituted alkylene radical, and low molecular weight diols and triols preferably containing tertiary amino groups, and
  3. aliphatic and/or cycloaliphatic diisocyanates in an NCO/OH ratio of from about 1.5:1 to 6:1 and
  4. ketoximes;

(B) aliphatic and/or cycloaliphatic polyamines containing at least two primary amino groups and (C) up to about 40% by weight of organic solvents.

The invention also relates to a process for producing the low-solvent reactive coating compositions and to their use for coating substrates by the direct, reverse and/or matrix coating process.

10 Claims, No Drawings

LOW-SOLVENT, THERMOSETTING REACTIVE POLYURETHANE COATING COMPOSITION, A PROCESS FOR ITS PRODUCTION AND ITS USE IN DIRECT AND REVERSE COATING PROCESSES

BACKGROUND OF THE INVENTION

1. Field of the Invention

This invention relates to thermosetting, low-solvent reactive polyurethane coating compositions, to a process for their production and to their use for direct, reverse and matrix reverse coating to form light-stable, non-oxidizing, non-yellowing, and non-hydrolyzing polyurethane ureas as coating polymers.

2. Description of the Prior Art

It is known that sheet-form textile materials may be coated with light-stable one-component polyurethane urea solutions containing up to 80% by weight of solvent. To obtain coating compositions of this type, which are described for example in German Offenlegungsschrift No. 2,252,280, polycarbonates containing hydroxyl groups are reacted with aliphatic diisocyanates and aliphatic diamines to form high molecular weight polyurethane ureas whose production and application involve the use of large quantities of solvents.

By contrast, low-solvent or solvent-free polyurethane coating compositions are known for example from German Offenlegungsschrift No. 2,902,090. In their case, the high molecular weight synthesis of the coating compositions is dispensed with from the outset and is replaced by the use of a suitable reactive system which may be processed in much the same way as a one-component system of the type first mentioned in conventional coating installations. The reactive components are, on the one hand, NCO-prepolymers which are produced from aromatic diisocyanates and both hydroxy polyethers and also hydroxy polyesters and of which the terminal NCO-groups are blocked with a ketoxime, and on the other hand polyamines.

Due to the presence in them of aromatic diisocyanates on the one hand and polyethers on the other hand, these coatings are not very stable to light. It is known that the subceptibility to oxidation of the above-mentioned polymer units leads to yellowing and degradation of the polymer chains and hence to a loss of tensile strength and elongation.

The same disadvantage of inadequate light stability and fastness to light also attends the chemicaly similar coating compositions according to German Offenlegungsschrift No. 2,814,079. However, since these coating compositions are primarily intended for adhesive coatings (the dispersion additive used has a thixotropic effect and prevents the coating from penetrating too deeply into the fabric), high light stability is not absolutely essential in this case either.

The object of the present invention is to provide a low-solvent reactive polyurethane urea coating system in which both the isocyanate compound and the relatively high molecular weight polyhydroxyl compound and also the amine-based crosslinking components are selected in such a way that the polymer obtained is fast to light, stable to light and, in addition, stable to oxidation and unaffected by hydrolysis. This system is intended to be readily processed—virtually as a one-component system—in conventional coating installations of the type used, for example, for PVC coatings to form dry surface coatings characterized by a high, hitherto unknown property level, the above-mentioned disadvantages of the prior art being avoided.

According to the invention, this object is achieved by the coating compositions described in detail in the following in which a special, liquid caprolactone-1,6-hexane diol polycarbonate, (cyclo)aliphatic diisocyanates and a "bis-carbazinic ester polyol" having a particularly stabilizing effect are used in a particular manner characteristic of the invention.

SUMMARY OF THE INVENTION

Accordingly, the present invention relates to low-solvent, thermosetting reactive polyurethane coating compositions based on a ketoxime-blocked NCO-prepolymer of relatively high molecular weight polyols, optionally low molecular weight chain-extending agents and excess polyisocyanates and a polyamine crosslinking agent and, optionally, solvents which may be hardened to form lightfast polyurethane ureas unaffected by light, oxidation, heat and hydrolysis, characterized in that the coating composition comprises the following components in the following molar ratios:

(A) a ketoxime-blocked, preferably butanone oxime-blocked NCO-prepolymer of (1) 1 mole of 2- to 4-functional, preferably 2- to 3-functional, relatively high molecular weight polyhydroxyl compounds having a molecular weight of from about 1000 to 4000 and preferably from about 1500 to 2500, wherein said 1 mole comprises (a) from about 0.5 to 1.0 mole of a polyester polycarbonate having a molecular weight of from about 1000 to 4000 and preferably from about 1500 to 2500 produced from diphenyl carbonate and ester glycols of ε-caprolactone and 1,6-hexane diol, and (b) up to about 0.5 moles of 2- to 4-functional, preferably 2- to 3-functional, more preferably 2-functional, relatively high molecular weight polyester polyols, preferably adipic acid polyesters with polyols containing 4 and more carbon atoms and having a molecular weight in the range from about 1000 to 4000 and preferably from about 1500 to 2500, (2) from about 0.1 to 1.2 moles and preferably from about 0.2 to 0.8 moles of low molecular weight polyols having molecular weights of from about 62 to 300, preferably diols, wherein the low molecular weight polyols comprise (c) from about 0.1 to 0.8 mole and preferably from about 0.2 to 0.5 mole of biscarbazinic ester polyols corresponding to the following general formula

in which R is a straight-chain and/or branched-chain $C_1$–$C_5$-alkylene or hydroxyl-substituted alkylene radical, preferably an ethylene and/or 1,2-propylene radical, and (d) up to about 1.1 mole of low molecular weight polyols, preferably diols and triols containing tertiary amino groups, and (3) aliphatic and/or cycloaliphatic diisocyanates in an NCO:OH ratio between the components of from about 1.5:1 to 6:1 and preferably from about 1.7:1 to 2.5:1 and (4) quantities of ketoximes, preferably butanone oxime, substantially equivalent to the NCO-content of the prepolymer, and as crosslinking agent (B) aliphatic and/or cycloaliphatic polyamines containing at least 2 primary amino groups, preferably as the main component cycloaliphatic diamines corresponding to the following general formula

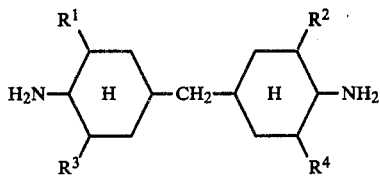

in which $R^1$, $R^2$, $R^3$ and $R^4$ independently of one another represent hydrogen or a $C_1$–$C_3$-alkyl group, with the proviso that at least about 75% of the diamine consists of the cis, cis-isomer when $R^1$ to $R^4$ all represent hydrogen, in NCO:NH-ratios between (A) and (B) of from about 1.2:1 to 0.8:1, preferably from about 1.05:1 to 0.95:1 and, more preferably, of the order of about 1:1, and (C) organic solvents so that reaction solutions containing up to about 40% by weight, preferably up to about 30% by weight and, more preferably, up to about 20% by weight of solvent are obtained.

The present invention also relates to a process for producing the low-solvent, thermosetting reactive coating compositions in the form of mixtures, characterized in that the NCO-prepolymers (A) described above and the polyamines (B) acting as crosslinking agents are mixed together with the solvents, which may be distributed between (A) and (B), at low temperatures, for example in the range from about 0° to 60° C.

The present invention also relates to the use of these reactive coating compositions in a direct, reverse and/or matrix reverse process for coating substrates. The coating compositions according to the invention may be applied either as surface coatings or as foam coatings by standard direct and/or reverse coating processes. They are also suitable for use in the formation of velour-like surface coatings using specially prepared silicone matrices, for example in accordance with U.S. Pat. Nos. 3,369,949; 3,655,497 and 4,124,428 and German Patent Nos. 1,933,255 and 3 004 327. To this end, the reactive coating composition is applied for example to the matrix, hardened by heating, the hardened coating removed from the matrix and optionally applied to a textile or leather support. To this end, the coating composition is preferably first heated to a temperature of from about 30° to 80° C., the coating paste passing through a viscosity minimum (max. approximately 30,000 mPas), so that the matrix is properly reproduced, and is then hardened by rapid heating to a temperature above about 90° C. and more particularly to a temperature of from about 140° to 180° C.

DETAILED DESCRIPTION OF THE INVENTION

According to the invention, the relatively high molecular weight polyhydroxyl compounds (A)(1)(a) used are relatively hydrophobic polyester polycarbonates containing hydroxyl groups which are liquid at room temperature and in which the ester units each contain 6 carbon atoms. They are obtained by reacting ε-caprolactone with 1,6-hexane diol in a molar ratio of approximately 1:1 and subsequently converting this ester glycol with diphenyl carbonate into the corresponding polyester polycarbonate diol having molecular weights in the range from about 1000 to 4000 and preferably in the range from about 1500 to 2500. This method of producing the polyester polycarbonates in question is described in German Auslegeschrift No. 1,770,245.

It is also possible to use mixtures of at least 50 mole percent of the above-mentioned polyester carbonates (A)(1)(a) with hydroxy polyesters (A)(1)(b) known per se based for example on adipic acid and glycols, such as ethylene glycol and propylene glycol, but preferably esters with diols containing 4 and/or more carbon atoms, for example 1,4-butane diol, 1,6-hexane diol, neopentyl glycol and/or β-methyl-1,6-hexane diol. The esters may also contain relatively small quantities of polyfunctional compounds, for example trimethylol propane, incorporated therein. They have a functionality of from 2 to 4 and preferably from 2 to 3; molecular weights of about 2000 are particularly preferred. It is particularly preferred to use mixtures of the described polyester polycarbonates having an average molecular weight of from about 1500 to 2500 with adipic acid polyesters of 1,6-hexane diol and neopentyl glycol having an average molecular weight of from 1500 to 2500 in a molar ratio of from about 60:40 to 80:20.

The ketoxime-blocked NCO-prepolymers(A) according to the invention also contain from about 0.1 to 1.2 moles and preferably from about 0.2 to 0.8 mole (per mole of relatively high molecular weight polyhydroxyl compound (A)(1)) of low molecular weight polyols (A)(2), preferably diols having a molecular weight of less than 300.

According to the invention, at least about 0.1 to 0.8 mole and preferably about 0.2 to 0.5 mole of the low molecular weight polyols used consist of bis-carbazinic ester polyols (A)(2)(c) corresponding to the following general formula

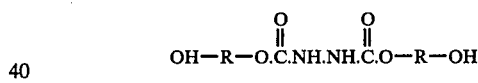

in which R is a straight-chain and/or branched-chain $C_1$–$C_5$-alkylene or hydroxyl substituted alkylene radical, preferably an ethylene and/or 1,2-propylene radical. The production and use of bis-carbazinic ester polyols for polyisocyanates, used for lacquers, is described in German application No. 30 39 824.4

These "bis-carbazinic ester polyols" are reaction products of 1 mole of hydrazine with 2 moles of a cyclic alkylene carbonate with 5- or 6-membered rings. Examples of the cyclic alkylene carbonates as reactive components are ethylene glycol and propylene glycol carbonate (2-oxo-1,3-dioxolane and 2-oxo-4-methyl-1,3-dioxolane), the reaction product of 1 mole of glycerol with 1 mole of diphenyl carbonate (2-oxo-4-hydroxymethyl-1,3-dioxolane) and 1,3-dioxanone-2-(ring compounds), of the type obtained by reacting for example 1,3-propane diol or neopentyl glycol with diphenyl carbonate. Ethylene glycol and propylene glycol carbonate are preferred reactants for the hydrazine. These bis-carbazinic ester polyols, preferably bis-carbazinic ester diols, are obtained by initially introducing hydrazine hydrate optionally dissolved in a solvent which moderates the reaction, such as toluene or isopropanol, adding the corresponding quantity of cyclic alkylene carbonate, completing the reaction at around 100° C. and finally removing the water of hydration and any solvent present by distillation. The compounds obtained in the form of colorless oils (preferably in the case of propylene carbonate derivatives) or in the form of solids (preferably in the reaction with ethylene carbonate) may be directly used in this form for the reactions according to the invention. The reaction product of hydrazine with propylene carbonate which at least predominantly contains secondary OH-groups is preferred. The incorporation of the bis-carbazinic ester polyols has a particularly surprising effect in the form of an improvement in the light fastness and light stability values (i.e. less discoloration and less degradation on exposure to light) and also in the form of a very distinct reduction in heat-induced yellowing during the hardening by heat of the multicomponent reactive coating compositions according to the invention.

In addition to the bis-carbazinic ester polyols as the low molecular weight polyhydroxyl compounds, it is also possible to use other standard polyols (A)(2)(d), for example 1,4-butane diol, 1,6-hexane diol, 2-ethyl-1,3-hexane diol, trimethylol propane, but preferably diols, triols and/or polyols containing tertiary aliphatic amino groups, for example N-methyl-bis-(2-hydroxypropyl)-amine, N-methyl-bis-(2-hydroxyethyl)-amine, N,N'-bis-hydroxyethyl piperazine or triethanolamine. It is particularly preferred to use mixtures of hydrazine/propylene glycol carbonate reaction products as component (A)(2)(c) and triethanolamine as component (A)(2)(d) in a molar ratio of from about 60:40 to 80:20.

The use of the tertiary amine polyols produces a further, in some cases synergistically intensifying, light-stabilizing effect, but in particular a high affinity for dyes or rather a good dye-fixing effect.

Suitable aliphatic and/or cycloaliphatic polyisocyanates (A)(3) are those of the type described for example in U.S. Pat. Nos. 3,984,607 and 4,035,213. Particular reference is made to hexamethylene-1,6-diisocyanate, 1-isocyanato-3,3,5-trimethyl-5-isocyanatomethyl cyclohexane (isophorone diisocyanate or IPDI) and 4,4'- and/or 2,4'-diisocyanato-dicyclohexyl methane, and to di- or tetra-$C_1$-$C_4$-alkyl derivatives of these diisocyanates and, in particular, to mixtures of the above-mentioned diisocyanates. Hexane diisocyanate, isophorone diisocyanate and 4,4'-diisocyanato-dicyclohexyl methane are preferred. It is also possible to use higher isocyanates, for example 1,6,11-triisocyanato-undecane, or biuret polyisocyanates based on hexane diisocyanate, although isocyanates such as these are less preferred.

The blocking agents (A)(4) used for the NCO-prepolymers are the usual ketoximes, for example of hydroxylamine and ketones, such as acetone, methyl ethyl ketone, diethyl ketone, cyclohexanone, acetophenone or benzophenone. It is preferred to use propanone oxime and, in particular, butanone oxime. They are used in substantially equivalent quantities, based on the NCO-groups of the prepolymer, although it is also possible to use sub-stoichiometric or even slightly overstoichiometric quantities of blocking agents.

The crosslinking component (B) used for the NCO-prepolymers (A) according to the invention is selected from aliphatic and, preferably, cycloaliphatic amines containing at least 2 primary amino groups of the type described in detail in German Offenlegungsschrift No. 2,814,079. It is preferred to use aliphatic and cycloaliphatic diamines $H_2N$—D—$NH_2$, such as for example 1,6-hexane diamine, 1,10-decane diamine or 1,12-dodecane diamine and also 1,6,11-undecane triamine, but preferably cycloaliphatic diamines, such as 2,4'- and/or 4,4'-diamino-dicyclohexylmethane and, in particular, cycloaliphatic diamines corresponding to the following formula

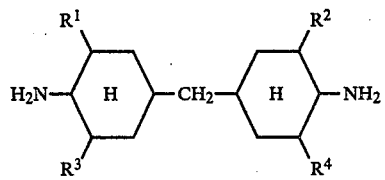

in which $R^1$, $R^2$, $R^3$ and $R^4$ independently of one another represent hydrogen or a $C_1$-$C_3$-alkyl group (methyl, ethyl, propyl or isopropyl group), with the proviso that at least 75% of the diamine consists of a cis, cis-isomer when $R^1$ to $R^4$ all represent hydrogen atoms.

According to the invention, it is preferred to use 4,4'-diamino-3,3'-dimethyl dicyclohexylmethane, a diamine of very low vapor pressure and suitable reactivity which is liquid at room temperature. It is preferably used as the predominant diamine (more than about 50 mole percent of all the amines).

The solvent (C) used may be ethyl acetate, methyl ethyl ketone, butyl acetate, xylene, N-methyl pyrrolidone, dimethyl formamide and/or dimethyl acetamide. By virtue of the blocked character of the NCO-groups, however, it is not absolutely essential to use only solvents that are inert to NCO-groups. For example, it is also possible to use isopropanol, ethylene glycol monomethyl ether and ethylene glycol monoethyl ether. The preferred solvent is ethylene glycol monomethyl ether acetate.

The quantity in which the solvent is used is selected in such a way that the NCO-prepolymers (A) or rather the mixture of (A), (B) and (C) is guaranteed an optimal processing viscosity, i.e. a processing viscosity in the range from about 20,000 to 50,000 mPas at 20° C. The solvent content of the final mixture of the reactive coating compositions amounts to at most about 40% by weight (=about 60% by weight solids content), although a solvent content of up to about 30% by weight is preferred, a mixture containing even less solvent, i.e. up to about 20% by weight of solvent, being particularly preferred. The solvents are used primarily for liquefying the NCO-prepolymers.

The blocked NCO-prepolymers according to the invention are produced in known manner by reacting all of the relatively high molecular weight polyhydroxyl compounds (A)(1)(a)+(A)(1)(b) and low molecular weight polyhydroxyl compounds (A)(2)(c)+(A)(2)(d) with excess polyisocyanate (A)(3) and optionally in the presence of a solvent (C) which is inert to free NCO groups, preferably at a temperature in the range from about 70° to 120° C., until the NCO-content reaches or falls just short of the calculated NCO-content.

Thereafter the remaining NCO-groups of this NCO-prepolymer are blocked with the stoichiometric quantity of ketoxime (A)(4) at about 60° to 90° C. and the processing viscosity is adjusted by the addition—if necessary—of more solvent (C).

An optionally multistage variant of the process may be used with advantage in case where low molecular weight polyols (A)(2)(d) containing basic groups, such as triethanolamine for example, are incorporated. In this case, the relatively high molecular weight polyhydroxyl compound components and the bis-carbazinic ester alkanol are reacted with the total quantity of diisocyanate at around 100° to 120° C. until the corresponding NCO-content is obtained, after which the reaction mixture is cooled to a moderate temperature, for example in the range from about 65° to 80° C., and then reacted at that temperature with the low molecular weight polyol components containing tertiary amine until the calculated final NCO-content is obtained. Finally, the blocking reaction with ketoximes is carried out as described above. In the production of the NCO-prepolymers described above, the NCO/OH-ratio of (A)

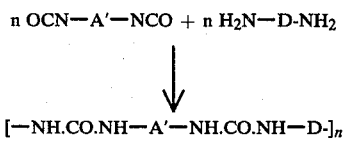

selected is generally from about 1.5:1 to 6.0:1 and preferably from about 1.7:1 to 2.5:1.

The relatively high molecular weight polyhydroxyl compounds (A)(1) are present in the ketoxime-blocked NCO-prepolymers (A) in quantities of from about 50 to 70% by weight while the low molecular weight polyols (A)(2) are present in quantities of from about 1 to 10% by weight and preferably in quantities of from about 3 to 7% by weight, the balance being formed by the polyisocyanates and the ketoximes.

The (blocked) NCO-prepolymers have an NCO-content of generally from about 2 to 7% by weight and preferably from about 3 to 4.5% by weight.

Mixing of the NCO-prepolymers (A) according to the invention with the polyamine crosslinking agents (B) is generally carried out at room temperature or at slightly elevated temperature substantially in the ratio of the reactive equivalents of the components, so that according to the invention the equivalent ratio of (blocked) NCO to NH$_2$ is generally between about 1.2:1 and 0.8:1, preferably between about 1.05:1 and 0.95:1 and, more preferably, of the order of about 1:1.

To produce coating compositions which are ready for use, additives known per se, such as for example pigments, leveling agents, such as silicones, UV-stabilizers, light stabilizers, oxidation inhibitors, fillers and/or blowing agents, may be introduced into the reactive mixtures according to the invention.

After application as coating compositions, the reactive mixtures according to the invention react with evaporation of the solvent to form polyurethane ureas in which the NCO-prepolymers (A) are attached through urea groups to the residues of the polyamines (B), for example in the case of difunctional components in accordance with the following scheme:

n OCN—A′—NCO + n H$_2$N—D-NH$_2$

↓

[—NH.CO.NH—A′—NH.CO.NH—D-]$_n$ in which n represents the number of components to be attached, A′ is the residue of the NCO-prepolymer without its terminal NCO groups,
with the proviso that the residue A′ contains at least about 50 mole percent of the relatively high molecular weight polyhydroxyl compounds in the form of 1,6-hexane diol/ε-caprolactone polycarbonates having a molecular weight of from about 1000 to 4000 and about 0.1 to 0.8 mole (per mole of relatively high molecular weight polyols) of bis-carbazinic ester diols corresponding to the following formula

in which R is as defined above.

The polymer is attached through aliphatic and/or cycloaliphatic diamines H$_2$N—D—NH$_2$ (as chain-extending agents or "crosslinkers"), where D is a difunctinal aliphatic and/or cycloaliphatic radical, preferably a 4,4′-dicyclohexylmethane radical, optionally C$_1$–C$_4$-alkyl-substituted.

For the production of coatings, the low-solvent, thermosetting reactive coating compositions according to the invention may be applied both by direct coating and also by reverse coating using coating machines of the type normally employed in practice. In addition, it is possible to produce velour-like coatings in specially prepared reverse coating machines using for example corresponding silicone matrices in conjunction with a suitable temperature profile.

To produce a reverse coating by the process according to the invention, the reactive mixture for the surface coating is first applied for example in a quantity of from about 30 to 100 g/m$^2$ to a suitable intermediate support, for example a separating paper or a silicone rubber matrix bearing an impression of certain leather surfaces and subsequently hardened in a drying tunnel at around 150° to 180° C., after which an adhesive coating, for example of the type described in German Offenlegungsschrift No. 2,902,090, is applied to the dry surface coating, the substrate is applied thereto, the coating is hardened at the necessary temperatures in another drying tunnel and the coated substrate is removed from the intermediate support.

As already mentioned, however, the reactive coating compositions according to the invention may also be directly applied to the textile substrate by direct coating. By applying the compositions in quantities of from about 50 to 200 g/m$^2$, it is possible in this way to produce coatings of different thickness according to the particular application envisaged, for example sports clothing or tarpaulin coatings or for the production of conveyor belts, life jackets, etc. The heating temperatures are generally above about 120° C. and preferably in the range from about 150° to 180° C. because blocked, aliphatic NCO-groups are thermally more stable and less reactive than aromatic NCO-groups and only split back or react with the aliphatic or cycloaliphatic polyamines to form polyurethane ureas at relatively high temperatures.

Although the reactive coating compositions according to the invention thus require higher temperatures and/or longer residence times in the drying tunnel for hardening than for example the coating compositions containing aromatic blocked NCO-groups according to German Offenlegungsschrift No. 2,902,090, it is surprising that the ester or carbonate groups do not apparently undergo aminolysis. The otherwise clearly discernible heat-induced yellowing of conventional coatings is also distinctly improved in the coating compositions according to the invention.

The coatings obtained are dry to touch and are equivalent in their mechanical properties to coatings produced from one-component polyurethane solutions. In addition, they are distinguished after aging by very high fastness to light (minimal discoloration), high resistance to light and hydrolysis and are unaffected by oxygen and oxidation. By virtue of the special caprolactone/1,6-hexane diol polyester polycarbonates used quantitatively as the main components in the coating compositions according to the invention, the coatings obtained have a pleasant, soft feel. Accordingly, coatings of this type may be used mainly in the outer clothing, shoe and upholstery fields. Another advantage of the polyester polycarbonates used in accordance with the invention lies in the fact that relatively little solvent is required for producing the processible coating compositions. If for example the coating compositions were to be synthesized with pure hexane diol polycarbonates, of the type used in German Offenlegungsschrift No. 2,252,280 to which reference has already been made, a considerably larger quantity of solvent would be required to keep products as highly crystalline as these in solution. On the other hand, the exclusive use of polyesters for the light-stable surface coating compositions gives rise to disadvantages, as explained in the following Comparison Example 2. Apart from their poor behavior in regard to hydrolysis after aging, these coatings have a much more tacky feel after hardening in the drying tunnel, in addition to which they undergo excessive expansion crystallization at temperatures as low as room temperature or just above room temperature. The invention is illustrated by the following Examples.

EXAMPLE 1

This Example describes the production of a coating composition according to the invention containing incorporated bis-carbazinic ester diol, its hardening to form a film in a conventional coating machine and also the properties of the film thus obtained.

A. Production of the bis-carbazinic ester diol 50 parts by weight of hydrazine hydrate and approximately 100 parts by weight of toluene are initially introduced into a reaction vessel and the two phases formed are thoroughly stirred. 204 parts by weight of propylene glycol carbonate (2-oxo-4-methyl-1,3-dioxolane) are then added in portions at room temperature which produces a slight increase in temperature to around 60° C. On completion of the addition, the mixture is stirred for 1 hour at 100° C., after which toluene and water of hydration are distilled off at that temperature under a pressure of 15 to 18 mbar, leaving 236 parts by weight of a clear colorless oil of the bis-carbazinic ester diol which, after distillation (110° C./0.04 mbar), has a measured molecular weight of 236. Formula:

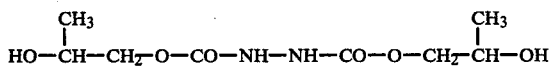

(and small quantities of the isomers containing primary OH-groups).

B. Production of the blocked NCO-prepolymer 1000 parts by weight of a hydroxyl polyester polycarbonate (OH number 56), produced from the ester glycol of ε-caprolactone and 1,6-hexane diol (1:1) with diphenyl carbonate in accordance with German Auslegeschrift No. 1,770,245, are reacted for about 2 hours at 115° C. with 298 parts by weight of 4,4'-diisocyanatodicyclohexyl methane until the measured NCO-content amounts to 4.1%. Thereafter a solution of 23.6 (0.1 mole) parts by weight of the bis-carbazinic ester diol described in stage A in 355 parts by weight of ethylene glycol monomethyl ether acetate is added and the reaction continued until the NCO-prepolymer solution has an NCO-content of 2.7%. After cooling to around 70° C., 94 parts by weight of butanone oxime are added and, after stirring for about another 10 to 20 minutes, the NCO-blocking reaction is checked with reference to the IR-spectrum. The oxime-blocked NCO-prepolymer (80% solids) is a colorless, clear liquid having a viscosity of 35,000 mPas at 20° C. and has a measurable, latent NCO-content of 2.5% and, hence, an NCO-equivalent weight of 1680.

C. Production of the blocking composition and the film and the properties of the film 1680 parts by weight of the prepolymer described in B. are mixed with 119 parts by weight, i.e. an equivalent quantity, of 4,4'-diamino-3,3'-dimethyl-dicyclohexyl methane. In addition, 10% by weight of a TiO$_2$-pigment (Bayer Titan R-KB-2—Bayer AG, Germany), 0.5% by weight of a oxalkylated silicone oil (Baysilon-Oil OL—Bayer AG, Germany) and 2% by weight of a silicate filler (Aerosil 380, Degussa, Germany) are worked into the mixture. The coating composition ready for use has a viscosity of approximately 30 000 mPa.s at room temperature and remains unchanged for some weeks at that temperature.

Using a conventional doctor roll coating machine, the coating composition is applied to a separating paper in a quantity of 90 g/m$^2$ and hardened in a drying tunnel for 5 minutes at 160° to 170° C.

The film obtained is flexible and dry to the touch and substantially retains its tensile strength, even after hydrolysis by aging for 6 weeks (70° C./95% relative air humidity). The tensile strength and elongation of the film both in its original state and after aging and exposure to light are determined in accordance with DIN 53 504.

The following results were obtained:

| Tensile Strength/Elongation | |
|---|---|
| (a) original | 30 MPa/450% |
| (b) after hydrolysis for 14 days (70° C./95% relative air humidity) | 30 MPa/450% |
| (c) after hydrolysis for 42 days (70° C./95% relative air humidity) | 27 MPa/430% |
| (d) after 400 hours' Xeno testing | 30 MPa/440% |
| Modulus 100% | 5 MPa |

EXAMPLE 2

(Comparison Example 1)

This Comparison Example is designed to include all the steps of Example 1 with one exception:

The liquid polyester polycarbonate used in accordance with the invention is replaced by a standard commercial hydroxyl polyester of adipic acid and ethylene glycol having an OH number of 56. The conditions under which this blocked NCO-prepolymer is produced and the mixing ratio for the coating composition correspond completely to those described in Example 1 B/C.

The film obtained after hardening under the same conditions as in Example 1 C is very tacky and "brittle" on account of the aminolysis which the polyester unit undergoes during crosslinking. After hydrolysis for only 14 days, its tensile strength has fallen to less than half the original level:

| Tensile Strength/Elongation | |
| --- | --- |
| (a) original | 18 MPa/350% |
| (b) after hydrolysis for 14 days (70° C./95% relative air humidity) | 8 MPa/300% |

EXAMPLE 3

(Comparison Example 2)

This Comparison Example describes the production of a coating composition which, in contrast to the coating composition of Example 1 according to the invention, does not contain any bis-carbazinic ester diol.

The properties of the film obtained, particularly after 400 hours' Xeno testing, are also described.

A. Production of the blocked NCO-prepolymer 1000 parts by weight of the hydroxyl polyester polycarbonate used in Example 1 (OH number of 56), produced from the ester glycol of ε-caprolactone and 1,6-hexane diol with diphenyl carbonate in accordance with German Auslegeschrift No. 1,770,245, are reacted for 2 hours at 115° C. with 262 parts by weight of 4,4'-diisocyanato-dicyclohexyl methane until the measured NCO-content amounts to approximately 2.9% (calculated 3.3%). While 338 parts by weight of ethylene glycol monomethyl ether acetate are added to it, the NCO-prepolymer is cooled to between 70° and 80° C. 87 parts by weight of butanone oxime are rapidly added at that temperature. After the slightly exothermic reaction has abated (about 10 to 20 minutes after addition of the oxime), no more NCO can be detected by IR-spectroscopy. The blocked NCO-prepolymer in the form of an 80% solution is a colorless, clear liquid having a viscosity of 40,000 mPas at 20° C. and has a measurable, latent NCO-content of 2.4% and, hence, an NCO-equivalent weight of 1750.

B. Production of the coating composition and film and properties of the film 1750 parts by weight of the prepolymer described in A are mixed with 119 parts by weight, i.e. an equivalent quantity, of 4,4'-diamino-3,3'-dimethyl dicyclohexyl methane. In addition, 10% by weight of a standard commercial pigment powder, 0.5% by weight of a silicone oil and 2% by weight of a silicate filler are worked into the mixture. The composition ready for use has a viscosity of approximately 40,000 mPas at 20° C. and remains unchanged for some weeks at that temperature.

Using a conventional doctor roll coating machine, the coating machine is applied to a separating paper in a quantity of 90 g/m² and hardened in a drying tunnel for about 5 minutes at 160° to 170° C.

The film obtained is elastic and non-tacky and, after 400 hours' Xeno testing, shows a distinct reduction in its tensile strength and elongation:

| Tensile Strength/Elongation | |
| --- | --- |
| (a) original | 28 MPa/500% |
| (b) after hydrolysis for 42 days (70° C./95% relative air humidity) | 25 MPa/450% |
| (c) after 400 hours' Xeno testing Modulus 100% | 17 MPa/200% 4 MPa |

EXAMPLE 4

This Example describes the production of a coating composition according to the invention containing incorporated bis-carbazinic ester diol, the properties of the film obtained therefrom, the reverse coating method, the production of an imitation velour and the respective properties of the coating.

A. Production of the blocked NCO-prepolymer 1000 parts by weight of the hydroxyl polyester polycarbonate used in Example 1 (OH number 56) and 500 parts by weight of a hydroxyl polyester of adipic acid, 1,6-hexane diol and neopentyl glycol (diol molar ratio 65:35; OH number 56) are reacted for about 2 hours at 115° C. with 296 parts by weight of 4,4'-diisocyanatodicyclohexyl methane and 261 parts by weight of hexamethylene diisocyanate until the measured NCO-content amounts to approximately 7.6% (calculated 7.8%). After cooling to 80° C., a solution of 600 parts by weight of ethylene glycol monomethyl ether acetate, 50 parts by weight of triethanolamine and 71.5 (0.304 mole) parts by weight of the bis-carbazinic ester diol produced in accordance with Example 1 is added. The mixture is then reacted for another 2.5 hours at 80° C. until the NCO-content has fallen to around 2.80% (calculated 2.88%). 183 parts by weight of butanone oxime are then stirred in and, after a short reaction time, no more NCO can be detected by IR-spectroscopy. The blocked NCO-prepolymer in the form of an 80% solution in a clear, pale yellow colored liquid having a viscosity of 45,000 mPas at 20° C. and has an NCO-equivalent of 1410 g.

The blocked NCO-prepolymer has a macropolyol content—excluding the solvent content—of 63.6% by weight and a low molecular weight polyol content of 5.1% by weight. The polyester polycarbonate content of the blocked NCO-prepolymer excluding the solvent content, amounts to 42.4% by weight and the bis-carbazinic ester diol content of 3.0% by weight.

B. Production of the surface coating composition, the film obtained therefrom and the properties of the film 1410 parts by weight of the prepolymer described in Section A are mixed with 119 parts by weight, i.e. an equivalent quantity, of 4,4'-diamino-3,3'-dimethyl-dicyclohexyl methane. The reaction mixture thus obtained may be stored for several weeks at room temperature without any increase in viscosity. In addition, 10% by weight of a standard commercial pigment powder, 0.5% by weight of silicone oil and 2% by weight of a silicate filler are worked into this surface coating paste. The paste ready for use has a viscosity of approximately 50,000 mPas.

This surface coating paste is processed in a quantity of 90 g/m² in the same way as described in Example 1 C to form a film which has the following properties:

| Tensile Strength/Elongation | |
| --- | --- |
| (a) original | 30 MPa/450% |
| (b) after hydrolysis for 14 days (70° C.; 95% relative air humidity) | 30 MPa/430% |
| (c) after hydrolysis for 42 days | 27 MPa/430% |
| (d) after 400 hours' Xeno testing Modulus 100% fastness to light (blue scale) softening range | 30 MPa/440% 7 MPa 7 >220° C. |

| Tensile Strength/Elongation | |
|---|---|
| swelling in perchloroethylene | <80% |

C. Production of a transfer coating

The above surface coating paste is applied to a separating paper in a quantity of 80 g/m² by means of one of the doctor rolls of a two-roll coating machine and hardened in a drying tunnel for about 3 to 5 minutes at 160° to 170° C. An adhesive coating is similarly applied by means of the second doctor roll. The adhesive coating may consist of known solution PUR products. Normally, however, it is also a low-solvent reactive system containing polyethers and aromatic isocyanates, of the type described in European Patent Application No. 4597 and in German Offenlegungsschrift No. 2,902,090.

The solvent adhesive coating has the following composition: a one-component polyurethane is dissolved to form a 35% solution in a mixture of DMF, methyl ethyl ketone and toluene (1:1:1). The solution thus formed has a viscosity of 35,000 mPas at 25° C. The polyurethane is obtained by reacting 1100 g of a butane diol adipate (OH number 56) with 103 g of 1,4-butane diol and 412 g of 4,4'-diisocyanato-diphenyl methane.

The low solvent adhesive coating has the following composition: 250 g of a 40% polyacrylate dispersion of butyl acrylate, styrene and N-methylol acrylamide and 68.5 g of 4,4'-diamino-3,3'-dimethyl dicyclohexyl methane as crosslinking agent are stirred into 1000 g of a blocked NCO-prepolymer. The blocked NCO-prepolymer is prepared as follows: 1600 g of a trimethylol-propane-started polyether of propylene oxide and approximately 20% of ethylene oxide (OH number 28) and 200 g of a polyether of bisphenol A and propylene oxide (OH number 200) are reacted after dehydration with 200 g of 4,4'-diisocyanato-diphenyl methane and 140 g of tolylene diisocyanate at a temperature of 90° C. until the NCO-content amounts to 2.9%. Thereafter 129 g of butanone oxime are added at 60° to 70° C. and the complete reaction of the NCO-groups is checked by IR-spectroscopy. The viscosity of the blocked NCO-prepolymer is adjusted to approximately 60,000 mPas at 25° C. by the addition of 44 g of isopropanol. The blocked NCO-group content amounts to 2.7%.

The sheet-form textile material, a roughened cotton fabric, is applied to the adhesive coating, to the above solvent adhesive coating or to the low-solvent adhesive coating. The coating as a whole then passes through the second drying tunnel where it is hardened for 2 to 3 minutes at around 130° to 160° C.

The coating has a dry, soft feel which also correlates with the 100% modulus value of the surface film of 7.0 MPa. The flexural strength values are good and the resistance to hydrolysis very good.

| Flexural Strength (Bally - Flexometer at 25° C.) | |
|---|---|
| (a) original | 150,000 bends without damage |
| (b) after hydrolysis for 14 days (70° C./95% relative air humidity) | 150,000 bends without damage |
| (c) after 400 hours' Xeno testing | 150,000 bends without damage |

Light stability is determined by the so-called Ford Test EU-BN 1-1. In this test, the coating is exposed to light under wet conditions (exposure time 120 Fadeometer Standard hours using a 15-17 A/130-145 V carbon arc lamp). Using a color comparator set to the grey scale or to the AATCC Grey Scale, the test specimen is assessed in daylight (northern hemisphere) for fading (depth of color) and—by comparison with the control specimen—for changes in color, changes in gloss or staining.

The coating passes this test without any deterioration. In addition, there is none of the embrittlement observed in the case of coatings containing polyethers (cf Example 5).

D. Production of an imitation velour

The coating composition according to Section B above is applied by knife coating in a quantity of approximately 200 g/m² to a matrix according to Example 1 of German Offenlegungsschrift No. 1,933,255. The matrix thus coated is then guided at a rate of approximately 9 meters per minute through a 9 meters long heating tunnel which is heated to an air temperature of 80° C. After passing through this first heating tunnel, the coated matrix is guided into a second tunnel through which it passes at the same speed. This second heating tunnel is 80 meters long and is kept at a temperature of 170° C. After cooling, the coating is removed from the matrix and strengthened by the adhesive application to its underneath of a cotton fabric roughened on one side or even of a blended polyester/cotton fabric weighing approximately 190 g/m². The fabric is applied to the smooth side of the coating using a standard commercial polyurethane one-component system (of solvent adhesive coating according to Section C).

The velour effect is intensified by brushing up the surface by means of brushing and buffing machines of the type commonly used in the textile industry. The velour may be further stabilized and improved in regard to its service properties by means of treatment and finishing processes known per se. A sheet-form textile with a suede-like surface is thus formed and may be used either as a shoe material or even for clothing purposes.

The surface of this PUR coating, which is considerably enlarged on account of the fine hairs, may be exposed to light in wet conditions as described in Section C without the fine hairs either hardening or sticking together. Nor is there any sign of discoloration in the velour coating. The imitation velour obtained with the coating composition according to the invention, which is unaffected by light, oxidation and hydrolysis, represents a considerable advance over conventional coating compositions because the very fine velour hairs are normally destroyed by rapid degradation under the effect of light and oxidation.

EXAMPLE 5

(Comparison Example 3)

This Comparison Example describes the production of a coating film containing polyethers, polyesters and aromatic diisocyanates and the deterioration in its properties under the effect of light.

A. Production of the blocked NCO-prepolymer 2000 g of a polyether based on trimethylol propane and propylene oxide (molecular weight 6000), 1000 g of a linear polyether based on propylene glycol and propylene oxide (molecular weight 1000), 1450 g of a linear polyester based on 1,6-hexane diol, neopentyl glycol and adipic acid (molecular weight 1700) and 22.5 g of 1,4-butane diol are reacted as hydroxyl components with 1125 g of 4,4'-diisocyanato diphenyl methane and 174 g of 2,4-diisocyanato toluene for about 3 hours at 80° to 90° C. until the measured NCO-content is just short of 4.26%. 496 g of butanone oxime and 696 g of methyl glycol acetate are then rapidly stirred in at 60° to 70° C. After 20 minutes, no more NCO can be detected by IR-spectroscopy. The blocked NCO-prepolymer, a colorless, clear liquid having a viscosity of approximately 40,000 mPas at room temperature, has a measurable latent NCO-content of 3.3% by weight and hence an NCOequivalent of 1280 g.

B. Production of the surface coating composition, the film obtained therefrom and the properties of the film 1280 g of the prepolymer described in A are mixed with 118 g, i.e. an equivalent quantity, of 4,4'-diamino-3,3'-dimethyl dicyclohexyl methane. In addition, 10% by weight of a standard commercial pigment paste, 0.5% by weight of silicone oil and 1.5% by weight of a silicate filler are worked in. The coating paste ready for use has a viscosity of approximately 60,000 mPas at 25° C.

Using a standard doctor roll coating machine, the coating composition is applied to a separating paper in a quantity of 90 g/m² and dried in a drying tunnel for 2 minutes at 140° to 160° C.

A non-tacky elastic film is obtained which, after 400 hours' Xeno testing, shows distinct signs of yellowing and a considerable reduction in tensile strength and elongation

| Tensile Strength/Elongation | |
|---|---|
| (a) original | 25 MPa/400% |
| (b) after hydrolysis for 14 days (70° C./95% relative air humidity) | 25 MPa/420% |
| (c) after 400 hours' Xeno testing | 10 MPa/150% |
| fastness to light | 3 |
| Modulus 100% | 6 MPa |
| softening range | >220° C. |
| swelling in perchloroethylene | 100% |

EXAMPLE 6

Production of the bis-carbazinic-bis-β-hydroxyethyl ester 50 parts by weight of hydrazine hydrate and 90 parts of toluene are initially introduced, after which 176 parts by weight of ethylene carbonate (2-oxo-1,3-dioxolane) are added in portions with thorough stirring, followed by stirring for another hour at 80° to 100° C.

After the solution has been concentrated, followed by crystallization, the carbazinic ester diol HO—CH₂—CH₂—O—CO—NH—NH—CO—O—CH₂—CH₂—OH melting at 146° C., (colorless crystals) is obtained.

When used in the same molar quantity instead of the carbazinic ester diol of Example 1-A, this carbazinic ester diol gives the same results (particularly improved resistance to yellowing) as obtained in Example 1-C or in Example 4.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

The pigment, silicone oil and silicate-filler used in examples 2, 3, 4 and 5 are the same as disclosed in example 1.

What is claimed is:

1. A low-solvent thermosetting reactive polyurethane coating composition which hardens to form light-fast polyurethane ureas with improved resistance to light, oxidation, heat and hydrolysis, characterized in that the coating composition comprises the following components in the following molar ratios:

(A) a ketoxime-blocked NCO-prepolymer of
  (1) 1 mole of 2- to 4-functional relatively high molecular weight polyhydroxyl compounds having a molecular weight in the range from about 1000 to 4000, wherein said 1 mole comprises
    (a) from about 0.5 to 1.0 mole of a polyester carbonate having a molecular weight of from about 1000 to 4000 produced from diphenyl carbonate and ester glycols of ε-caprolactone and 1,6-hexane diol and
    (b) up to about 0.5 mole of 2-functional to 4-functional relatively high molecular weight polyester polyols having a molecular weight of from about 1000 to 4000;
  (2) from about 0.1 to 1.2 moles of low molecular weight polyols having molecular weights in the range from about 62 to 300, wherein said low molecular weight polyols comprise
    (c) from about 0.1 to 0.8 mole of bis-carbazinic ester polyols corresponding to the following general formula $$HO-R-O.\overset{O}{\underset{\|}{C}}.NH.NH.\overset{O}{\underset{\|}{C}}.O-R-OH$$

in which R is a straight-chain and/or branched-chain $C_1$–$C_5$ -alkylene or hydroxyl-substituted alkylene radical and
    (d) up to about 1.1 mole of low molecular weight polyols;
  (3) aliphatic and/or cycloaliphatic diisocyanates in an NCO:OH ratio between the components

of from about 1.5:1 to 6:1, and
  (4) quantities of ketoximes substantially equivalent to the NCO-content;
(B) a crosslinking agent which comprises aliphatic and/or cycloaliphatic polyamines containing at least two primary amino groups at an NCO/NH₂ ratio of (A) to (B) between about 1.2:1 and 0.8:1; and
(C) up to about 40% by weight based on the total weight of the coating composition, of at least one organic solvent said organic solvent being sufficient to obtain a viscosity for the mixture of (A), (B) and (C) of from about 20,000 to 50,000 mPa.s at 20° C.

2. The coating composition as claimed in claim 1, characterized in that component (A) is a ketoxime-blocked NCO-prepolymer of 1 mole of 2- to 3-functional polyhydroxyl compounds having an average molecular weight of from about 1500 to 2500, wherein said 1 mole comprises (a) from about 0.5 to 1.0 mole of a linear polyester polycarbonate having a molecular weight of from about 1500 to 2500 produced from diphenol carbonate and ester glycols of ε-caprolactone and 1,6-hexane diol and (b) up to about 0.5 mole of 2- to 3-functional polyester polyols having a molecular weight of from 1500 to 2500 synthesized from components comprising diols containing 4 or more carbon atoms.

3. The coating composition as claimed in claim 1 or 2, characterized in that from about 0.1 to 0.8 mole of bis-carbazinic ester diols corresponding to the following formula $$HO-R-O.\overset{O}{\underset{\|}{C}}.NH.NH.\overset{O}{\underset{\|}{C}}.O-R-OH$$

in which R is a straight-chain and/or branched $C_1$–$C_5$-alkylene radical, are used as component (A)(2)(c).

4. The coating composition as claimed in claim 1 or 2, characterized in that in the bis-carbazinic ester diols the radical R is an ethylene and/or 1,2-propylene radical.

5. The coating composition as claimed in claim 1 or 2, characterized in that aliphatic diols and triols containing tertiary amino groups are used as component (A)(2)(d).

6. The coating composition as claimed in claim 1 or 2, characterized in that the NCO-prepolymers (A) are prepared using cycloaliphatic diisocyanates in NCO-/OH-molar ratios between the components $$\left(\frac{3}{1+2}\right)$$

of from about 1.7 to 2.5:1.

7. The coating composition as claimed in claim 1 or 2, characterized in that aliphatic and/or cycloaliphatic primary diamines are used as the polyamines (B) in an NCO/$NH_2$ ratio of from about 1.05:1 to 0.95:1.

8. The coating composition as claimed in claim 1 or 2, characterized in that the predominant diamine is a cycloaliphatic diamine corresponding to the following formula

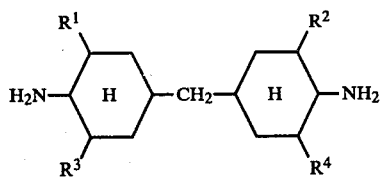

in which $R^1$, $R^2$, $R^3$ and $R^4$ independently of one another represent hydrogen or a $C_1$–$C_3$-alkyl group, with the proviso that at least about 75% of the diamine comprises the cis, cis-isomer when $R^1$ to $R^4$ all represent hydrogen.

9. A process for the preparation of a low-solvent thermosetting reactive polyurethane coating composition which hardens to form light-fast polyurethane ureas with improved resistance to light, oxidation, heat and hydrolysis, which comprises:

(A) forming a ketoxime-blocked NCO-prepolymer by reacting (1) 1 mole of 2- to 4-functional relatively high molecular weight polyhydroxyl compounds having a molecular weight in the range from about 1000 to 4000, wherein said 1 mole comprises (a) from about 0.5 to 1.0 mole of a polyester carbonate having a molecular weight of from about 1000 to 4000 produced from diphenyl carbonate and ester glycols of ε-caprolactone and 1,6-hexane diol and (b) up to about 0.5 mole of 2-functional to 4-functional relatively high molecular weight polyester polyols having a molecular weight of from about 1000 to 4000; and (2) from about 0.1 to 1.2 moles of low molecular weight polyols having molecular weights in the range from about 62 to 300, wherein said low molecular polyols comprise (c) from about 0.1 to 0.8 mole of bis-carbazinic ester polyols corresponding to the following general formula $$HO-R-O.\overset{O}{\underset{\|}{C}}.NH.NH.\overset{O}{\underset{\|}{C}}.O-R-OH$$

in which R is a straight-chain and/or branched-chain $C_1$–$C_5$-alkylene or hydroxyl-substituted alkylene radical and (d) up to about 1.1 mole of low molecular weight polyols; with (3) aliphatic and/or cycloaliphatic diisocyanates in an NCO:OH ratio between the components $$\left(\frac{3}{1+2}\right)$$

of from about 1.5:1 to 6.1; and (4) subsequently blocking the terminal isocyanate groups with a substantially equivalent amount of ketoximes;

(B) adding a crosslinking agent which comprises aliphatic and/or cycloaliphatic polyamines containing at least two primary amino groups at an NCO/$NH_2$ ratio of (A) to (B) between about 1.2:1 and 0.8:1; and (C) adding up to about 40% by weight based on the total weight of the coating composition, of at least one organic solvent before, during or after the production of (A) or the addition of (B) said organic solvent being sufficient to obtain a viscosity for the mixture of (A), (B) and (C) of from about 20,000 to 50,000 mPa.s at 20° C.

10. A process for the production of coatings which comprises applying the coating composition of claim 1 or 2 by the direct, reversal or matrix coating process and curing the said composition by heat to form polyurethane ureas.

* * * * *